Sept. 20, 1938.  W. E. URSCHEL  2,130,937
MATERIAL CUTTING AND DICING MACHINE
Filed March 15, 1935  3 Sheets-Sheet 1
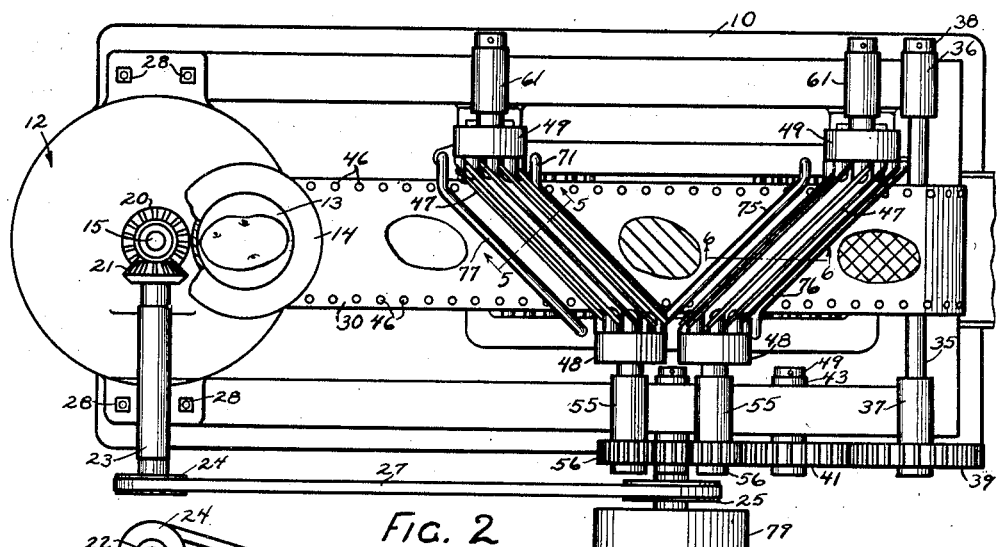
Fig. 2
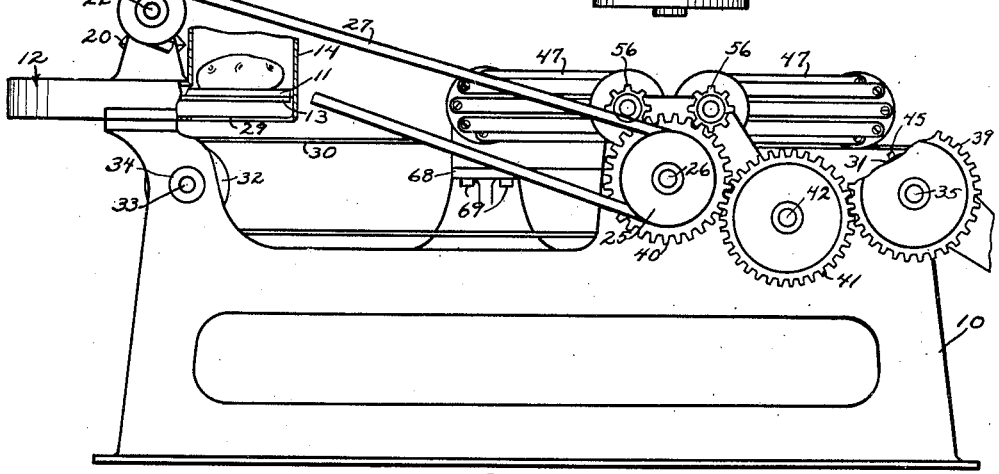
Fig. 1
Fig. 4
INVENTOR.
William E Urschel
BY
ATTORNEY Sept. 20, 1938.   W. E. URSCHEL   2,130,937
MATERIAL CUTTING AND DICING MACHINE
Filed March 15, 1935   3 Sheets-Sheet 2

INVENTOR.
William E. Urschel
BY
ATTORNEY

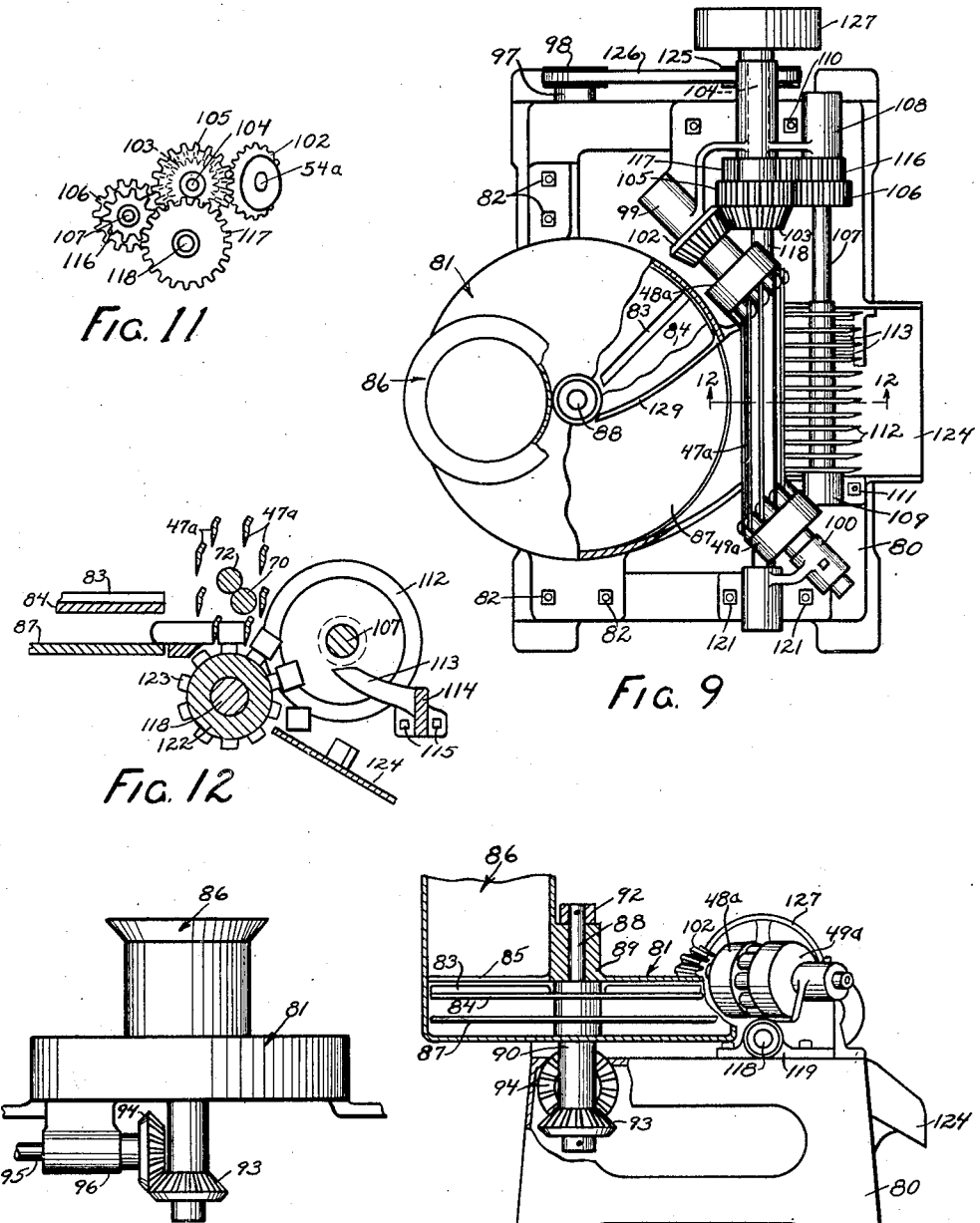

Patented Sept. 20, 1938

2,130,937

UNITED STATES PATENT OFFICE 2,130,937

MATERIAL CUTTING AND DICING MACHINE

William E. Urschel, Valparaiso, Ind.

Application March 15, 1935, Serial No. 11,229

13 Claims. (Cl. 146—78)

My invention relates to an improved fruit and vegetable cutter and dicer.

The invention has for its objects, among others, the provision of the following:

Improved means for dicing and otherwise cutting vegetables;

An unique means for cutting vegetables into pieces of selected size and shape;

A new system of knives for cutting articles into a plurality of parts; and

An improved mechanical movement for knives.

These objects and other objects which will be apparent in the following description are obtained by the novel and useful elements and their selection, construction and arrangement hereinafter described, and disclosed in two physical embodiments in the accompanying three sheets of drawings hereby made a part of this application and in which:

Figure 1 is a side elevation of a machine embodying one form of the invention;

Figure 2 is a plan view of the machine illustrated in Figure 1;

Figure 4 is a plan view of the conveyor belt support shown in Figure 1 but with the belt removed;

Figure 9 is a plan view, partly in section, of a second machine embodying a modified form of the invention;

Figure 10 is a side elevation, partly in section, of the machine shown in Figure 9;

Figure 11 is a detail in elevation of the gear assembly employed in the machine illustrated in Figure 9, the positions of the gears being reversed;

Figure 12 is a sectional view of the cutting elements shown in Figure 9 and taken on the line 12—12 of that figure;

Figure 13 is an elevation of the slicer element housing illustrated in Figure 9.

Like reference characters are used to designate the same parts in the drawings and in the description which follows.

The present invention comprises in part knives mounted for parallel, nonrotating circular movement in bearing blocks rotating on axes at an angle to the long axes of the knives so that as the bearing blocks turn, the knives have an arcuate thrust and will cut material that is maintained in their path. Two or more sets of knives may be placed at different angles to provide cross cuts, producing squares, or rectangles, or diamonds, or a number of other selected shapes. When the vegetables are fed to the knives in slices of a thickness about equal to the distance between any two adjacent knife cuts, and two sets of knives are set at right angles to each other, the vegetables or fruit will be diced, or cut up into cubes.

Figure 3:
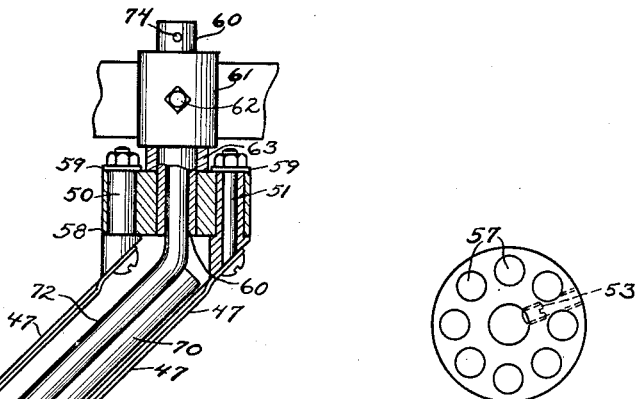
Figure 3 is an enlarged, longitudinal and approximately median sectional view of the knife assembly shown in Figures 1 and 2.

Reference should be had first principally to Figures 1, 2 and 3 of the drawings. The reference character 10 designates an integral base for the machine. Knives 11 forming a part of a slicing means are secured to a disc 13, within a housing or casing 12 having an upper and lower wall, and pass beneath the lower end of a hopper 14 that opens into casing 12 through its upper wall. The disc 13 has a hubbed section that is pinned to a shaft 15 which is journaled in bearing boxes that may be integral with the upper and lower walls of said slicer casing 12.

A bevel gear 20 is keyed to the upper extremity of shaft 15 and is driven by bevel gear 21. Bevel gear 21 is pinned to one extremity of a shaft 22 journaled in a bearing box 23 which may be integral with the upper wall of slicer casing 12. A pulley 24 is conventionally secured to the other extremity of shaft 22 and is driven by a pulley 25 pinned to a main drive shaft 26 through belt 27. Bolts 28 secure slicer casing 12 to the frame 10.

The slicer mechanism illustrated in Figures 1 and 2 is of the same nature as the slicer in Figures 9, 10 and 12, in which the mechanism is more completely illustrated. In the machine shown in Figures 9, 10 and 12, the vegetables or fruit are fed into a hopper 86 and fall through an opening 85 therein. Below hopper 86 is a disk 84 on which disk are mounted knives 83, the same as knives 11 in Figure 1. Below each knife 83 is an opening in disk 84.

The hopper 86 holds the vegetable or fruit from moving with disk 84. The same is true of disk 13 so that as the disk 84 or 13 is rotated the knives 83 or 11 cut slices from the vegetable or fruit. In the device of Figure 1, such slices fall through opening 29 onto a conveyor 30. In the device of Figures 9, 10 and 12, the slices fall onto a lower disk 87 from which they are guided by a barrier 129 into cutters later to be described.

Reference will again be had to Figures 1 and 2. A conveyor belt 30 is driven by a pulley 31 and idles upon a pulley 32. Pulley 32 is conventionally secured to a shaft 33 rotatably mounted in bearing boxes 34 which may be integral with the side members of frame 10. Pulley 31 is pinned to a shaft 35 journalled in the bearing boxes 36 and 37. Shaft 35 is held in position by a collar 38 and a spur gear 39 pinned to the opposite ends of said shaft.

Spur gear 40, keyed to shaft 26, drives gear 39 through an intermediate gear 41, pinned to a stub shaft 42. Shaft 42 is journaled in the bearing box 43 and is held in position by the gear 41 and a collar 44. Fingers or peg-like projections 45 upon pulley 31 cooperate with circular openings 46 in belt 30 to provide a positive and synchronous drive for the belt 30.

Figure 7:
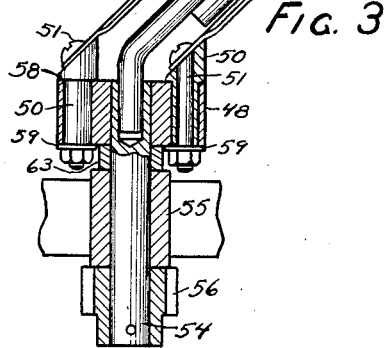
Figure 7 is a plan view of one of the knife bearing blocks.

Knives 47, of which there are two sets, one set of which is illustrated in Figure 3, are mounted upon axially parallel bearing blocks 48 and 49 that are not in alignment. The blades 47 are held in position upon bearing pins 50 by means of bolts 51. Bearing blocks 48 which are contiguous are the driving members and bearing blocks 49 which are spaced apart are the driven members. Blocks 48 are provided with a set screw 53 (Figure 7) securing the blocks upon shafts 54. Shafts 54 in the device of Figure 1 are journaled in bearing boxes 55 which may be integral with frame 10. Spur gears 56, pinned to the other extremity of shafts 54 are concurrently driven by gear 40, thus providing means for driving bearing blocks 48.

Bearing pins 50 are journaled in regularly spaced circular apertures 57 in bearing blocks 48 and 49 and are held in position in said blocks by shoulders 58 at one end and washers 59 at the other end. Bearing blocks 49 are rotatably mounted upon tubular shafts 60 secured in brackets 61 by the set screw 62. The brackets 61 may be integral with frame 10.

Collars 63 between blocks 48 and 49 and collars 61 and 55 serve to fix the position of the knife assemblies transversely of the frame 10. The two knife assemblies are identical in construction and action. One assembly is in one angular position to the bed of frame 10 and the other is in an opposed angular position thereto.

The surface of belt 30 is maintained in a fixed plane below the center of each set of knives 47 by a series of rollers 64, 65 and 66 (Figure 4), mounted on bars journaled in the side members of a sub-frame 67, which is secured to extension lugs 68 on frame 10 by bolts 69. This arrangement of rollers provides an oblique support for the belt 30 parallel to the longitudinal extent of knives 47 without tending to warp the belt to one side or the other. The rollers allow a direct forward movement of the belt without lateral twisting or strain.

Figure 5:
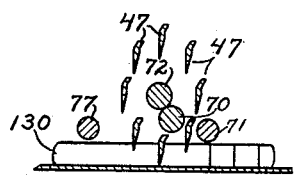
Figure 5 is a transverse section of one set of the knives shown in Figure 2 and taken on the line 5—5 of such figure.

Reference should now be had to Figure 5. Rods 70 and 71 are mounted slightly above the position which will be occupied by a sliced vegetable or fruit 130 on the upper surface of belt 30 and are parallel to the longitudinal axes of the knives 47. Rods 70 and 71, of which rod 70 is the more highly mounted, prevent any of the cut portions of the vegetables from adhering to the knives 47.

Rod 70 is welded or otherwise secured to a rod 72 (see Figure 3). One extremity of rod 72 is freely mounted in a circular aperture 73 in shaft 54 and the other end of said rod is secured in a like aperture in tubular shaft 60 by the pin 74. One extremity of rod 71 projects downwardly and is conventionally secured in one side member of sub-frame 67, while the opposite extremity is welded to a rod 75 whose downward projecting extremities are secured in the side members of sub-frame 67 (Figure 4).

Rods 76 and 77 are secured to sub-frame 67 in the same manner as the hereinbefore described rod 75. Rod 76 serves the same purpose as does rod 71. Rods 75 and 77 prevent the rearward extremities of the vegetable or fruit slices from being lifted when their forward extremities come in contact with a set of knives 47. This measure insures cuts normal to the upper surface of belt 30.

Figure 8:
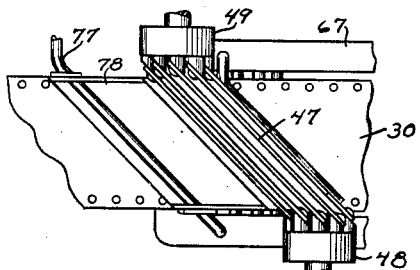
Figure 8 is a fragmentary plan view of a modified form of holding device.

When small vegetables or fruits are sliced, a plate 78 (Figure 8), may be pivotally mounted upon rods 75 and 77 to hold the slices in a position to be normally acted upon by knives 47.

A pulley 79 keyed to drive shaft 26 provides means for transmitting to shaft 26 the power necessary to actuate the mechanisms of the machine. This pulley is omitted from Figure 1 in order to show more clearly the gears driven by it.

Reference will again be had to the second form of the invention illustrated in Figure 9 and succeeding figures. In this form of the invention one series of knives 47a only (like knives 47) is used. Such series of knives 47a cooperates with a series of circular knives 112 whose cutting planes are substantially normal to the cutting planes of knives 47a.

The device illustrated in Figures 9 and 10 has a legged base 80. The slicing unit housed in casing 81, which has already been described, is secured to base 80 by bolts 82. Slicing knives 83 secured to disk 84 pass beneath the opening 85 in hopper 86 and slice off portions of a vegetable or fruit contained in hopper 86 and allow the slices to fall upon the lower disk 87. The hubs of disks 84 and 87 are pinned to a shaft 88 journaled in bearing boxes 89 and 90, which bearing boxes may be integral with the casing 81. Shaft 88 is held in position by means of a collar 92 and a bevel gear 93 pinned at opposite extremities of said shaft. Bevel gear 93 is driven by a bevel gear 94 pinned to one end of a shaft 95 (Figure 13). Shaft 95 is journaled in boxes 96 and 97 (Figures 13 and 9) which may be integral with the slicer housing 81 and the base 80, respectively. A belt pulley 98 is conventionally secured to the other end of shaft 95 and may be used both to position said shaft against axial displacement and to provide means for driving the slicer unit in housing 81.

As hereinbefore stated, the set of knives 47a illustrated in the form of the invention shown in Figure 9 are identical with either set of knives 47 illustrated in Figures 2 and 3. The various parts associated with the set of knives 47a bear the same reference characters as the earlier described sets of knives save that the letter "a" is added thereto. The bearing blocks for the knives 47a are designated 48a and 49a. A shaft 54a (see Figure 11) is rotatably mounted in a bearing block 99 (see Figure 9) and a tubular shaft (not shown) like shaft 60 is mounted in a bracket 100 (see Figure 9) by a set screw not shown but like set screw 53. The shaft 54a and the shaft corresponding to shaft 60 and the set screw like set screw 53 and like parts are the same as the same numbered parts in the other form of the device.

A bevel gear 102 is pinned to the shaft 54a and is driven by a bevel gear 103 keyed or otherwise secured to a shaft 104. A spur gear 105 is keyed to shaft 104 adjacent to the bevel gear 103 and drives a spur gear 106 pinned to a shaft 107. Shaft 107 is journaled in bearing boxes 108 and 109 which may be secured to base 80 by the bolts 110 and 111 respectively.

Circular knives 112 are conventionally secured in a spaced relation upon the shaft 107 and have their cutting edges normal to the longitudinal axes of knives 47a. Finger-like members 113, (Figure 12) are positioned between the knives 112 to prevent any of the pieces of vegetables or fruits cut by knives 112 from adhering to said knives. Fingers 113 may be integral with a rectangular bar 114 which may be secured at its extremities to frame 80 by bolts 115. Only a fragment of bar 114 and the fingers thereon is illustrated in Figure 9.

A spur gear 116 is keyed to shaft 107 and drives a spur gear 117 which is pinned to a shaft 118 journaled at each end in bearing boxes 119, only one of which is shown. The illustrated bearing box 119 is secured to frame 80 by bolts 121. A roll 122 having ribs 123 (Figure 12) is conventionally secured to shaft 118. The ribs 123 on roll 122 are parallel to the longitudinal axis of the knives 47a and are at a fixed position directly beneath said knives. The movement of knives 47a and of roll 122 is synchronized that the knives 47a penetrate the space between adjacent ribs 123 which support a fruit or vegetable, it being thus made possible to obtain a clean cut through the fruit or vegetable without the knives 47a contacting any hard or supporting surface. Projections 123 on roll 122 are slotted or grooved to admit a portion of the cutting edges of knives 112. The diced fruit or vegetables, after passing the knives 112, fall into chute 124 upon frame 80 and are discharged from the machine into any suitable receptacle or conveyor.

A belt pulley 125 pinned to one extremity of shaft 118 drives the slicing disk 83 through a belt 126 and belt pulley 98 heretofore mentioned.

A standard drive pulley 127 conventionally secured to shaft 104, which is journaled in a bearing box 128, is adapted to drive the machine.

Figure 6:
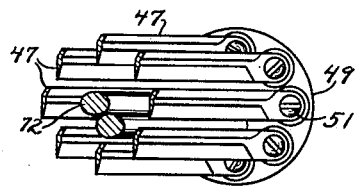
Figure 6 is an oblique section of the other set of the knives shown in Figure 2 and taken on the line 6—6 of such figure.

From Figures 3, 5 and 6 it can be readily understood that knives 47 travel in a circular path, inasmuch as the bearing pins 50 secured at each end of said knives are parallel to the axes of rotation of the bearing blocks 48 and 49 while the knives 47 are disposed angularly to said axes; that is, the bearing blocks 48 and 49 have axes of revolution at an oblique angle to the axes of the knives 47 thereon. Although the knives 47 travel in a circular path, they do not rotate, and they always point in one direction. Therefore, the cutting planes of the knives are at all times normal to the plane of the belt 30 upon which the slices of vegetables or fruits approach said knives. This cannot be accomplished by the common form of rotary knife, and it is important, since in a suitable product all faces of the finished dice or cube should be normal to each other.

Because of the angle at which the bearing blocks 48 and 49 rotate, the knives 47 have a longitudinal motion with respect to objects on the moving conveyor, as well as a downward and upward motion. What has been said about knives 47 and bearing blocks 48 and 49 is true of knives 47a and bearing blocks 48a and 49a.

In the form of the invention illustrated in Figures 1 and 2, the slicing unit is driven by a belt cooperating with pulleys on the slicer unit and the main drive shaft. The cutting disk is set in motion by a set of bevel gears. Revolution of the cutting disk causes slices to be severed from vegetables and fruits disposed in the feed hopper of the slicing unit and to be deposited upon the conveyor belt 30 passing beneath said unit.

The conveyor belt 30 is driven from the main drive shaft by a train of gears Apertures 46 disposed along both edges of the conveyor belt 30 register with fingers 45 on the belt drive roll 31, providing a positive drive for said belt, and make certain that slices of vegetables and fruits will be suitably spaced apart and not pile upon one another. Rod 77 will tend to spread any slices which may become inadvertantly piled one on another.

Drives for knives 47 are geared to the same drive shaft as the conveyor 30, both the conveyor and the knife drive using the same gear secured to the drive shaft. In this manner a positive connection is provided between the two drives. This enables the speed of both drives to be timed so that the speed of the conveyor belt and the forward speed of the knives 47 at the point of contact of their circular traverse will be the same.

The conveyor belt 30 presents the slices deposited upon said belt to the two sets of knives 47. The two sets of knives are disposed at opposite angles of forty-five degrees to the direction of the conveyor travel and have their cutting planes normal to each other. This causes the slices presented to said means to be cut into squares, and since the thickness of the slices is approximately the same as each dimension of the squares cut by the two sets of knives the resultant product is a dice or a cube. After passing through the dicing means, the vegetables or fruits are discharged from the conveyor belt into a chute (shown fragmentarily in Figures 1 and 2) by which chute they are guided into a suitable receptacle.

The main shaft drive pulley in the machine shown in Figure 9 drives the slicer unit by means of two gears and a belt drive. The cutter disk in the slicing unit is set in motion by a set of bevel gears and severs slices of uniform thickness from vegetables or fruits disposed in the feed hopper. The severed slices drop upon a disk positioned beneath the cutter disk and are carried around upon the lower disk until they are contacted by the barrier 129 which is so formed that it guides the slices into the cutting means 47a.

Bevel gears connect the knife drive with the main drive shaft. The peripheral speed of roll 122, Figure 12, is the same as the forward speed of the knives 47a along the bottom of their elliptical traverse. The knives 47a and the roll 122 cooperate in conveying the sliced vegetables acted upon by said knives to the set of circular knives 112 disposed in spaced relation to the rear of knives 47a. The cutting planes of the circular knives 112 are normal to the cutting planes of knives 47a, so knives 47a cut the slices of vegetables transversely and the circular knives cut the slices longitudinally, the result being that the fruits or vegetables are cut into rectangular fragments of uniform thickness.

The vegetable or fruit fragments acted upon by the two sets of knives 47a and 112 fall into the chute 124, as previously stated, which chute serves to guide the diced fruit or vegetable into a suitable receptacle.

If it is desired, strips such as are required for shoe string or French fried potatoes can be made by using only one cutting unit in either form of the invention described herein.

What is claimed as new and is desired to be secured by Letters Patent of the United States is:

1. In combination, a slicer comprising means for slicing vegetables and fruit, a conveyor to receive the slices of vegetables and fruit, and a plurality of knives contiguous to said conveyor and movable in parallel paths with their edges at all times toward said conveyor, the edges one after another moving substantially into contact with said conveyor at the lowest point of their paths, and mounting means for said knives whereby said knives penetrate into and move with the slices of vegetable and fruit on said conveyor.

2. A dicer comprising means for slicing vegetables and fruit, a conveyor to receive the slices of vegetables and fruit, a plurality of knives arranged in series above said conveyor and movable about a common axis in parallel, nonrotating paths with their edges at all times pointed toward said conveyor, said knives one after another substantially contacting said conveyor at the lowest point of their paths, and another and like series of knives movable about another common axis at an angle to the axis of said first series, said series of knives cooperating to cut slices of vegetables and fruit on said conveyor into portions of selected size and shape.

3. In a cutting machine the combination of means for conveying a flat slab of material along a predetermined path, opposed rotatable heads mounted on each side of the conveying means with their axes of rotation out of alinement, a plurality of spaced-apart knives each having an end connected to an opposed head, means for rotating said heads in synchronism with the movement of said conveying means, and a rigid member having its ends mounted in the axis of rotation of each of said heads, said bar being disposed centrally of the path of travel of said knives whereby to prevent the adherence of material to said knives during the cutting action.

4. A cutting member for a material strip cutting device comprising opposed rotatable heads mounted with their axes out of alinement, a bar having its ends each mounted at the axis of one of said heads, and a plurality of relatively flat knives, each having an end connected to a mounting in one of the heads, there being means for maintaining the knives in parallel relation and for moving the same in a closed circular path about the centrally disposed bar.

5. A cutting device comprising opposed spaced-apart rotatable heads having their axes out of alinement, means for rotating said heads in synchronism, a plurality of relatively flat cutting knives, each end of the knife having a mounting disposed eccentrically to the axis of rotation of its head, there being means for maintaining the knives in parallelism and for causing them to move in a circular path of travel with the heads, and means disposed at the axis of the path of travel of said knives for preventing the adherence of material to said knives.

6. A cutting device comprising opposed spaced-apart rotatable heads having their axes out of alinement, means for rotating said heads in synchronism, a plurality of relatively flat cutting knives, each end of the knife having a mounting disposed eccentrically to the axis of rotation of its head, there being means for maintaining the bars in parallelism and for causing them to move in a circular path of travel with the heads, and a stationary bar disposed at the center of rotation of said knives for effecting a cleaning action for preventing the adherence of material to said knives.

7. In a material cutting machine, the combination of an endless flat belt, means for moving the same in a horizontal path of travel, means for feeding slices of material in position to lie flat on said belt and to travel therealong, a pair of opposed, rotatable heads mounted on opposite sides of said belt and above the same, means for rotating said heads in synchronism with the predetermined rate of travel of said belt, and a group of said heads being disposed with their axes of rotation parallel but out of alinement, and a group of knives having their ends connected eccentrically to the axis of rotation at each of said heads, there being means for maintaining the knives in parallel spaced relation to cause the same to travel in a closed path successively to penetrate the material on said belt to cut the same into parallel sections.

8. In a material cutting machine, the combination of an endless flat belt, means for moving the same in a horizontal path of travel, means for feeding slices of material in position to lie flat on said belt and to travel therealong, a pair of opposed, rotatable heads mounted on opposite sides of said belt and above the same, means for rotating said heads in synchronism with the predetermined rate of travel of said belt, a group of said heads being disposed with their axes of rotation parallel but out of alinement, a group of knives having their ends connected eccentrically to the axis of rotation at each of said heads, there being means for maintaining the knives in parallel spaced relation to cause the same to travel in a closed path successively to penetrate the material on said belt to cut the same into parallel sections, and a second group of similar knives, said second set of knives being disposed with their axes disposed at an angle to the first mentioned knives so as to cut the material cut by said first knives into smaller sections.

9. In a dicing machine the combination of an elongated roller, means for rotating the roller, said roller having radially extending spaced-apart supports, means for feeding the flat material onto said supports as they rotate, a group of spaced-apart cutting knives disposed above said path of travel of the supports, said knives being disposed in parallel relation, means for moving said knives in a closed path of travel to cause the same to penetrate the material mounted on said supports and between the spaces on said supports, said means causing the withdrawal of said knives after cutting said material whereby to cut said material in strips, and a set of circular knives disposed to rotate about an axis extending parallel to the axis of rotation of said knives, said second set of knives being disposed to extend into the spaces between said supports, said second set of knives cutting the material into smaller sections of symmetrical shape and cross-section.

10. A material cutting device comprising means for slicing relatively flat pieces of material, said slicer comprising a conveyor adapted to receive relatively flat pieces of material to be cut, and convey the same in a predetermined path of movement, a plurality of knives contiguous to said conveyor and mounted to move in a closed path with their cutting edges at all times toward the conveyor and at all times substantially parallel with the surface thereof, the knives one after another in their path of movement presenting their cutting edges substantially into contact with said conveyor, the path of the contacting knife being in the same direction and said knife moving at substantially the same speed as the movement of the conveyor whereby said knives penetrate into and move with the slice of material on the conveyor.

11. A material cutting device comprising means for slicing relatively flat pieces of material, said slicer comprising a conveyor adapted to receive relatively flat pieces of material to be cut, and convey the same in a predetermined path of movement, a plurality of knives contiguous to said conveyor and mounted to move in a closed path with their cutting edges at all times toward the conveyor and at all times substantially parallel with the surface thereof, the knives one after another in their path of movement presenting their cutting edges substantially into contact with said conveyor, the path of the contacting knife being in the same direction and said knife moving at substantially the same speed as the movement of the conveyor whereby said knives penetrate into and move with the slice of material on the conveyor and are retracted reversely from the cut as the slices are so moved.

12. In a machine for slicing material, a conveyor to receive the material, means to actuate the conveyor to move the material at a predetermined rate in a fixed predetermined path; and a plurality of knives contiguous to said conveyor and movable in closed curved paths generally tangent to the path of the conveyor and in the same direction at said zone of tangency; said knives being substantially parallel with each other and with the supporting surfaces of the conveyor at all times and having their edges presented substantially throughout said path in a direction toward the conveyor, the edges one after another moving substantially into contact with said conveyor and mounting means for the knives whereby said knives penetrate into the material and means to move said knives in said path at substantially the same speed as the conveyor adjacent said zone of tangency.

13. In a cutting device, the combination of a conveyor adapted to move in a horizontal path of travel and adapted to feed a flat slab of material therealong, a group of spaced apart relatively flat knife blades disposed over the path of travel of said material, means for maintaining the said knife blades in parallel planes at all times and for causing them to travel in a closed circular path into the material so fed to cut the same into strips of uniform width and to be withdrawn from the cut in the reverse direction, means to maintain said knife blades in said parallel planes during travel into and out of the material whereby to present the knives to the material at the same angular relationship at all times, and means disposed on opposite sides of the path of travel of said knives for maintaining said material in flat condition on the conveyor.

WILLIAM E. URSCHEL.